United States Patent [19]
Futral

[11] Patent Number: 5,706,471
[45] Date of Patent: Jan. 6, 1998

[54] I-O REGISTER LOCK FOR PCI BUS

[75] Inventor: William T. Futral, Portland, Oreg.

[73] Assignee: Intel Corporation, Santa Clara, Calif.

[21] Appl. No.: 580,378

[22] Filed: Dec. 28, 1995

[51] Int. Cl.$^6$ .................................................. G06F 13/00
[52] U.S. Cl. ..................... 395/490; 395/287; 395/427; 395/481; 395/494; 395/821; 395/855; 395/853
[58] Field of Search .......................... 395/287, 427, 395/481, 490, 494, 821, 855, 853

[56] References Cited

U.S. PATENT DOCUMENTS

| | | | |
|---|---|---|---|
| 5,469,558 | 11/1995 | Lieberman et al. | 395/285 |
| 5,566,304 | 10/1996 | Regal | 395/285 |
| 5,617,559 | 4/1997 | Le et al. | 395/496 |
| 5,634,138 | 5/1997 | Ananthan et al. | 395/841 |
| 5,644,788 | 7/1997 | Courtright et al. | 395/855 |
| 5,649,125 | 7/1997 | Tietjen et al. | 395/306 |
| 5,651,137 | 7/1997 | MacWilliams et al. | 395/468 |
| 5,651,138 | 7/1997 | Le et al. | 395/481 |

*Primary Examiner*—Jack B. Harvey
*Assistant Examiner*—Valerie Darbe

*Attorney, Agent, or Firm*—Blakely, Sokoloff, Taylor & Zafman

[57] ABSTRACT

A computer system having a bus providing signals for determining a next bus transaction; a processor connected to the bus; and a bus device connected to the bus, the bus device having a first register connected to the bus, a first gate connected to the first register through an output of the first gate, and, a multiple access inhibitor unit connected to a first input of the first gate through an output of the multiple access inhibitor unit. In a bus having a bus master and a bus target, a method of preventing access to a memory mapped register in a transaction, having the steps of detecting a STOP signal, a FRAME signal, a IRDY signal, a TRDY signal, and a DEVSEL signal; generating an access enable signal to the memory mapped register when the FRAME signal is not asserted and the IRDY signal, the TRDY signal, and the DEVSEL signal is asserted; generating the access enable signal to the memory mapped register when the DEVSEL signal is not asserted; preventing generation of the access enable signal to the memory mapped register when the FRAME signal, the IRDY signal, the TRDY signal, and the DEVSEL signal are asserted; and preventing generation of the access enable signal to the memory mapped register when the STOP signal and the FRAME signal is asserted.

15 Claims, 4 Drawing Sheets

I-O REGISTER LOCK FOR PCI BUS

BACKGROUND OF THE INVENTION

1. Field of the Invention

The present invention relates to the field of use of computer system bus architectures and memory mapped input/output (I/O) devices. More particularly, the present invention relates to the protection of memory mapped registers for I/O devices located on buses which provide signals indicating the actions of the next bus cycle.

2. Description of Related Art

A current trend in I/O systems design is to place the registers of an I/O device in the memory address space so that each register of the I/O device is accessed by an unique address. In many of these designs, accessing a memory mapped register through either a read or a write operation will cause a value change in that register, which in turn may cause a state change in the I/O device containing that register—regardless of the data value that is read or written. For example, when a first-in, first-out (FIFO) memory mapped register is accessed by a read operation, the value at the top of the FIFO stack will be popped off. Another example is where an I/O device has a memory mapped register containing a RESET bit which, when accessed during normal operations, will cause the I/O device to initiate its initialization procedures.

One problem resulting from the use of these memory mapped registers is that even though the reading of memory is normally non-intrusive, the reading of a memory mapped register may inevitably cause an unwanted state change, data loss, or corrupted operation. Moreover, writing a memory mapped register will almost always produce one or more of these undesirable results. Unfortunately, a number of applications routinely scan memory, generating read commands to consecutive addresses to look for certain data. For example, I/O device drivers often search for the existence of particular I/O devices by reading consecutive memory locations and searching for the signature of the device. A signature can consist of data such as a plug-and-play header for a local area network (LAN) card or a descriptor block of a tape drive device.

It would be desirable if a solution can be found to prevent the accessing of memory mapped I/O registers from applications that scan memory.

SUMMARY

Recently developed bus architectures often provide signals that indicate the action of the next bus cycle. For example, the bus architecture defined by the Peripheral Component Interconnect (PCI) Local Bus Specification, revision 2.0, published by the PCI Special Interest Group, includes a set of signals which can be used to determine if the current PCI transaction is to be a single access transaction or a part of a sequence of accesses. By monitoring the signals provided by the PCI bus, the invention allows an I/O device to ignore memory cycles accessing certain memory mapped registers of the I/O device when those cycles are part of a memory scan. Thus, certain registers can only be accessed by operations which specifically access only a single location and thereby are assumed to be valid, non-memory scanning, accesses.

In providing this protection from out-of-band accesses that would normally cripple the operation of an I/O device, the invention utilizes a state machine that tracks the state of the PCI transaction using the following PCI signals: device select (DEVSEL), initiator ready (IRDY), target ready (TRDY), FRAME, and STOP. An access enable signal allowing access to the memory mapped registers of a device is generated only if the PCI data cycle is the first—and intended to be the last—data cycle of the PCI transaction. Conversely, an inverse of the access enable signal is an indication to ignore the transaction as the transaction is not a single access transaction.

In addition to protecting memory mapped registers from memory scan operations, the invention also protects the registers against the inadvertent accesses caused by some third parties software programs trying to perform some value added memory search. Also, the invention allows I/O devices to recognize and ignore a transaction if the transaction was terminated prematurely when originally intended to be part of a scan.

Other objects, features and advantages of the invention will be apparent from the accompanying drawings, and from the detailed description that follows below.

DETAILED DESCRIPTION OF THE INVENTION

The present invention provides a method and apparatus for locking-out accesses to memory mapped registers of a device. For purposes of explanation, specific embodiments are set forth to provide a thorough understanding of the present invention. However, it will be understood by one skilled in the art, from reading this disclosure, that the invention may be practiced without these details. Further, although the present invention is described through the use of system component buses that conform to the Peripheral Component Interconnect (PCI) Local Bus Specification, revision 2.0, published by the PCI Special Interest Group, most, if not all, aspects of the invention apply to system component bus architectures which allow for the detection of the type of feature bus transactions in general where it is desirable to prevent accesses to memory mapped registers under certain circumstances. Moreover, well-known elements, devices, process steps and the like are not set forth in detail in order to avoid obscuring the present invention.

Figure 1:
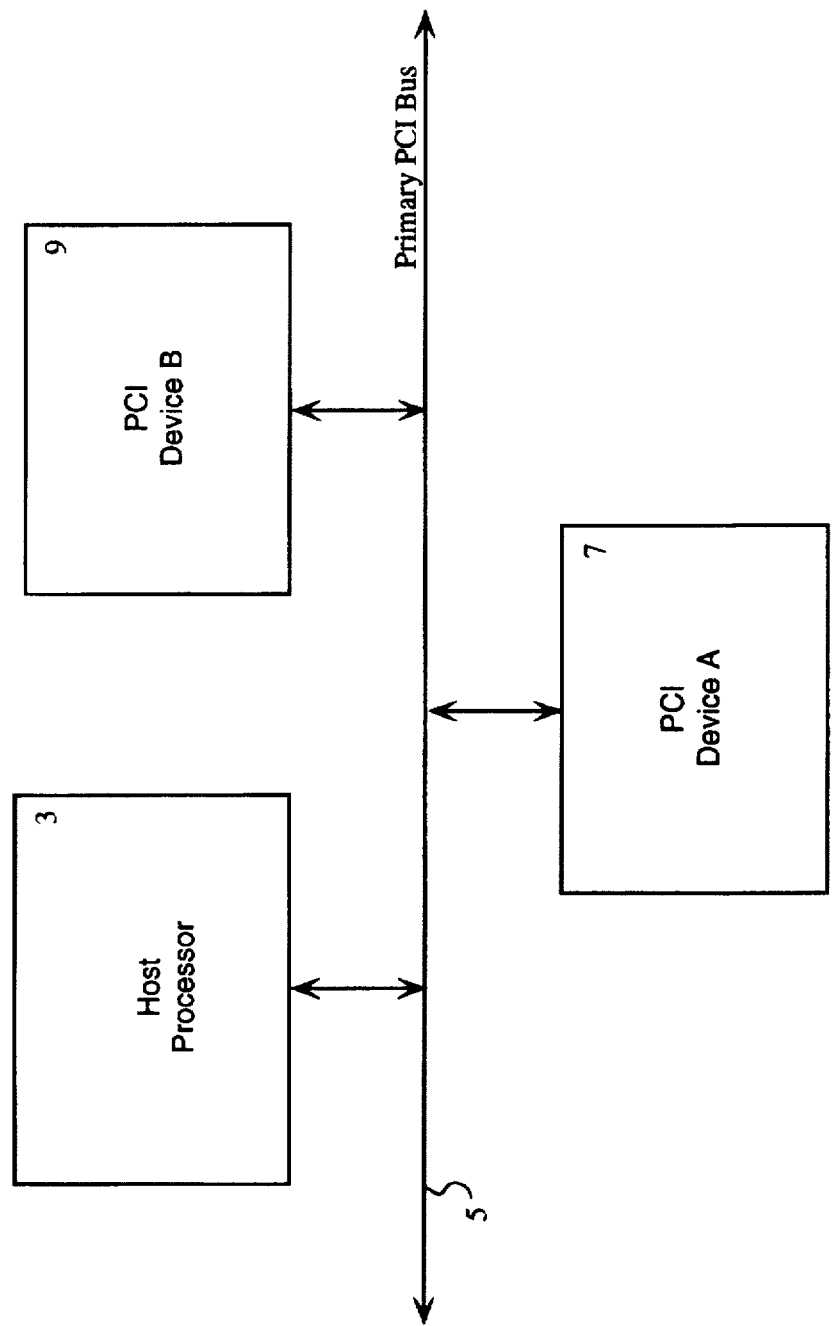
FIG. 1 illustrates a computer system containing a PCI device configured in accordance with a preferred embodiment of the invention.

FIG. 1 illustrates a computer system 1 configured in accordance with a preferred embodiment of the invention, wherein a host processor 3 is coupled to a primary PCI bus 5 for communicating with a PCI device A 7 and a PCI device B 9. Primary PCI bus 5 is a bus configured in accordance with revision 2.0 of the PCI Local Bus Specification. Host processor 3, PCI device A 7, and PCI device B 9 also conform to the standard in so far as it applies to the operation of these devices as necessary for implementing the invention, as described below.

Figure 2:
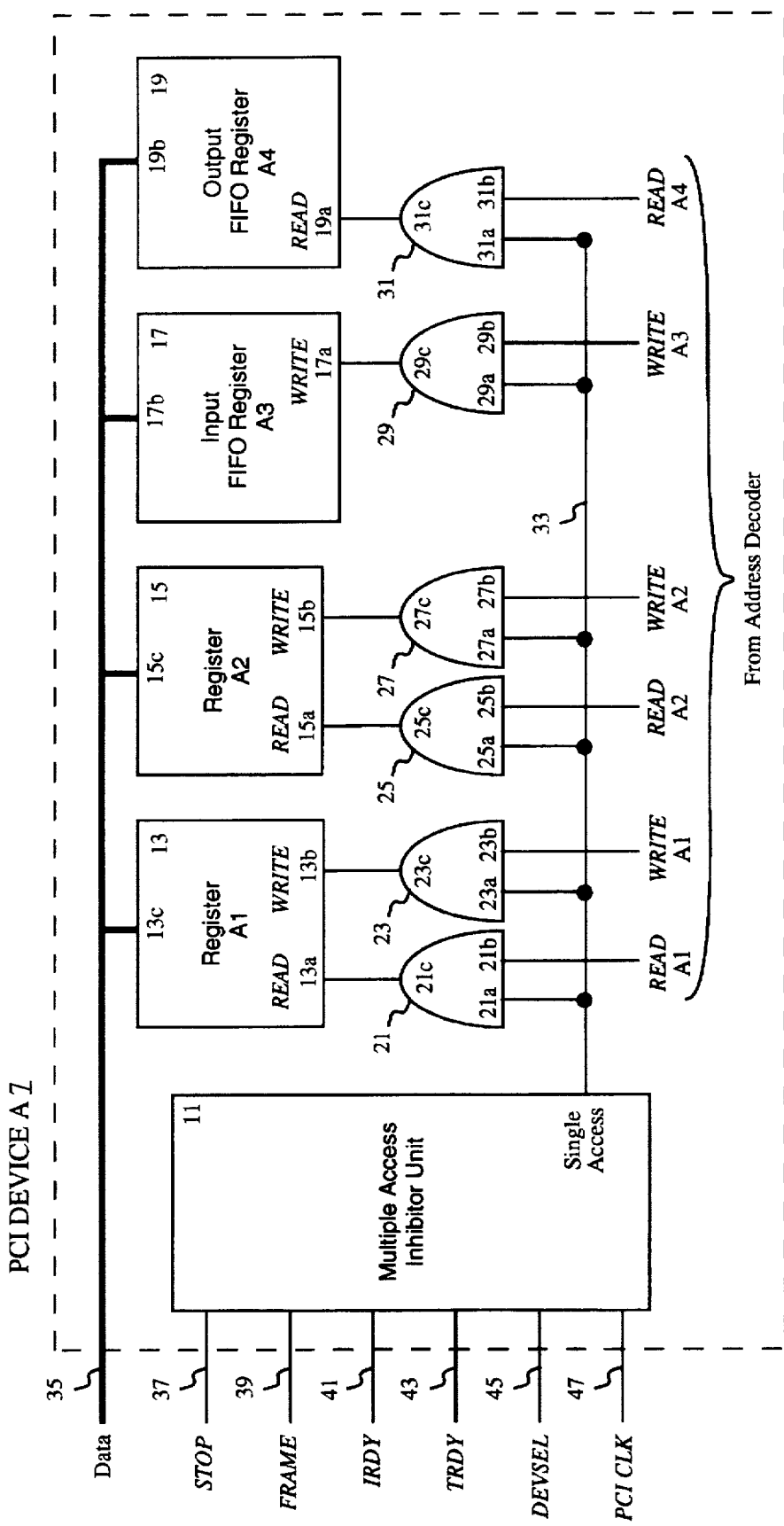
FIG. 2 illustrates a PCI device containing a multiple access inhibitor unit configured in accordance with a preferred embodiment of the invention.

FIG. 2 illustrates PCI device A 7 configured in accordance with a preferred embodiment of the invention, wherein a multiple access inhibitor unit 11 controls the accessing of a register A1 13, a register A2 15, an input first-in, first-out (FIFO) register A3 17, and an output FIFO register A4 19 through the use of AND gates 21, 23, 25, 27, 29 and 31. Multiple access inhibitor unit 11 is coupled to AND gates 21, 23, 25, 27, 29 and 31 through the use of an access inhibitor line 33.

Register A1 13 and register A2 15 are read enabled—i.e., the registers will be placed in a mode for being read—when a logical 1 is asserted at a read enable port 13a of register A1 13 and a read enable port 15a of register A2 15, respectively. In addition, register A1 13 and register A2 15 are write enabled—i.e., the registers will be placed in a mode for receiving data —when a logical 1 is asserted on a write enable port 13b of register A1 13 and a write enable port 15b of register A2 15, respectively. Similarly, input FIFO register A3 17 is write enabled when a logical 1 is asserted at a write enable port 17a of input FIFO register A3 17 and output FIFO register A4 19 is read enabled when a logical 1 is asserted at a read enable port 19a of output FIFO register A4 19. As illustrated in FIG. 2, the value at an output 21c of AND gate 21 will equal the value at a second input 21b of AND gate 21 when a first input 21a of AND gate 21 receives a logical 1. Thus, register A1 13 receives the value of a READ A1 signal when there is a logical 1 at first input 21a of AND gate 21. Similarly, the values at outputs 23c, 25c, 27c, 29c and 31c will equal the values at second inputs 23b, 25b, 27b, 29b and 31b, respectively, when first inputs 23a, 25a, 27a, 29a and 31a receive a logical 1. Conversely, if first inputs 21a, 23a, 25a, 27a, 29a and 31a receive a logical 0, then outputs 21c, 23c, 25c, 27c, 29c and 31c will output a value of 0 to read enable port 13a, write enable port 13b, read enable port 15a, write enable port 15b, write enable port 17a and read enable port 19a, respectively, regardless of the values at second inputs 21b, 23b, 25b, 27b, 29b and 31b, respectively. As the output of multiple access inhibitor unit 11 is coupled to AND gates 21, 23, 25, 27, 29 and 31 through first inputs 21a, 23a, 25a, 27a, 29a and 31a, respectively, by the use of access inhibitor line 33, multiple access inhibitor unit 11 controls whether the values at second inputs 21b, 23b, 25b, 27b, 29b and 31b are passed through to outputs 21c, 23c, 25c, 27c, 29c and 31c, respectively, through the outputting of a logical 1 or a logical 0, respectively.

READ A1 signal, WRITE A1 signal, READ A2 signal, WRITE A2 signal, WRITE A3 signal and READ A4 signal is generated by an address decoder (not shown) on PCI device A 7. Address decoders for PCI devices are well known in the art. Thus, no further discussion will be given to the address decoder except where necessary.

Multiple access inhibitor unit 11 receives the following PCI signals: a STOP signal 37, a FRAME signal 39, an initiator ready (IRDY) signal 41, a target ready (TRDY) signal 43, a device select (DEVSEL) signal 45, and a PCI clock (PCI CLK) signal 47. The operation of multiple access inhibitor unit 11 will be further described in the discussion of FIG. 3 and FIG. 4, below.

Register A1 13, register A2 15, input FIFO register A3 17 and output FIFO register A4 19 respond to read and write operations through the use of data ports 13c, 15c, 17b, and 19b, respectively. Data ports 13c, 15c, 17b, and 19b are connected to a data line 35 for sending and receiving data over the PCI bus. For example, when register A1 13 receives a logical 1 at write enable port 13b, it will receive the data to be written from data line 35.

According to the PCI local bus standard, the end of a data transfer cycle occurs when IRDY signal 41 and TRDY signal 43 are both asserted. In addition, FRAME signal 39 being asserted at the end of the data cycle indicates that another transfer cycle will follow at the next sequential address. Otherwise, where FRAME signal 39 is not asserted, the current cycle is the last data transfer cycle of the transaction. DEVSEL signal 45 is used to indicate that the data transfer is not complete when DEVSEL signal 45 is asserted. Thus, through the use of the signals, it is possible to predict whether or not the next cycle is a multiple access transaction; thereby forming the basis of the state machine contained in FIG. 3.

Figure 3:
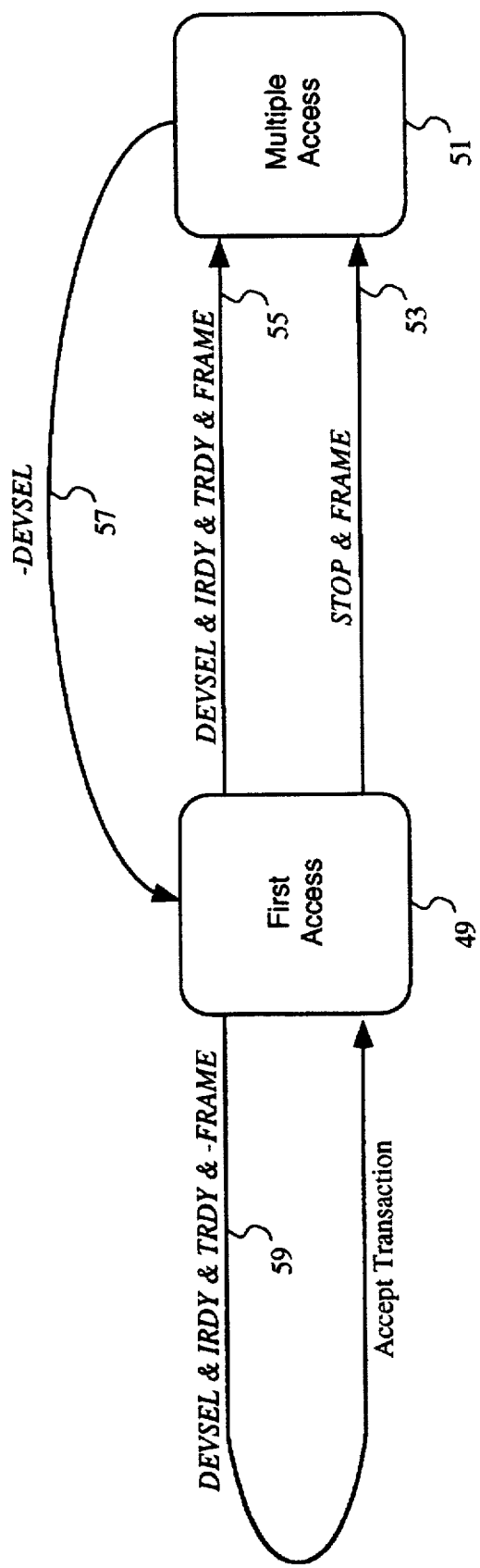
FIG. 3 contains a state diagram illustrating the operation of a preferred embodiment of the invention.

FIG. 3 contains a state machine showing the operations of a preferred embodiment of the invention. As illustrated, there are two states in the state machine; a first access state 49 and a multiple access state 51. First access state 49 is reached when DEVSEL signal 45 is deasserted (-DEVSEL), as illustrated by transition line 57, indicating that all data transfers from a PCI transaction is completed. When state machine is in first access state 49, if DEVSEL signal 45, IRDY signal 41 and TRDY signal 43 is asserted while FRAME signal 39 is deasserted (FRAME), as shown in transition line 59, indicating that the current state is first access state 49 and the end of transfer has occured—i.e., the transaction is a single access transaction—the state machine will not change states.

Multiple access state 51 will be reached when: (1) DEVSEL signal 45, IRDY signal 41, TRDY signal 43 and FRAME signal 39 are asserted, as shown in transition line 55, indicating that the transaction is a multiple access transaction; or, (2) STOP signal 37 and FRAME signal 39 are asserted, as shown by transition line 53, indicating that a target DISCONNECT operation has occured, whereby even though the cycle may be a single access transaction, the cycle was originally intended to be a multiple access transaction but is a single access transaction only because the cycle is terminated by the target.

Operation of the state machine contained in FIG. 3 does not deviate from the description above even in the special cases where there is a DISCONNECT signal, a RETRY signal or a TARGET ABORT signal. The RETRY signal will not be accepted because TRDY signal 43 will not be asserted. The TARGET ABORT signal will not be accepted because DEVSEL signal 45 is deasserted. The target DISCONNECT signal will be rejected if the DISCONNECT is signaled—i.e., STOP signal 37 is asserted—before FRAME signal 39 is deasserted. Otherwise, in spite of the DISCONNECT signal, the transaction was intended as a single access transaction and will be accepted.

Figure 4:
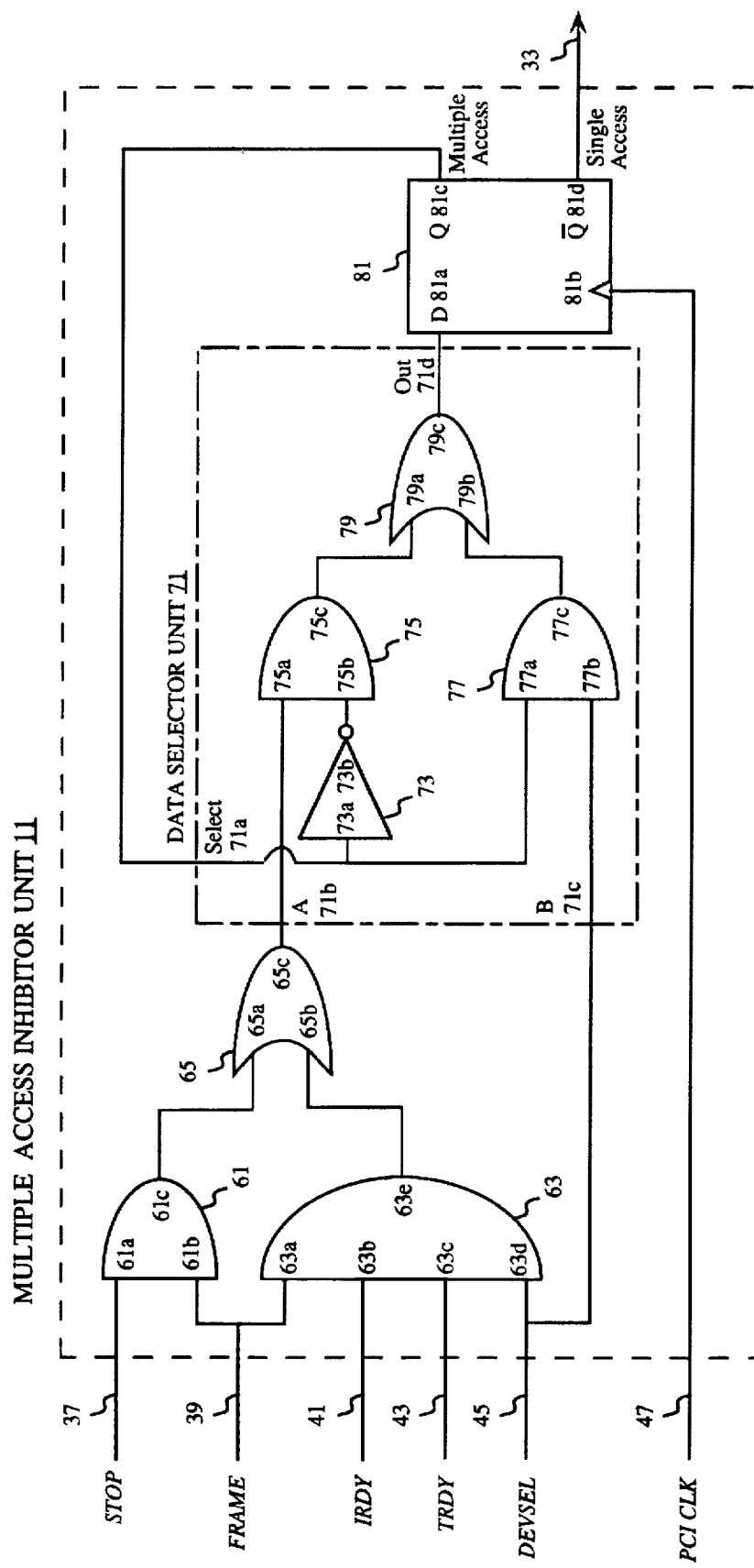
FIG. 4 illustrates the multiple access inhibitor unit containing a circuit which implements the state diagram contained in FIG. 3.

FIG. 4 illustrates multiple access inhibitor unit 11 configured in accordance to a preferred embodiment of the invention. Specifically, multiple access inhibitor unit 11 implements the state machine contained in FIG. 3, whereby AND gates 61 and 63, OR gates 65, data selector unit 71, and flip flop 81 is coupled together to detect whether the next PCI transaction is a multiple or a single access transaction.

Data selector unit 71 includes a NOT gate 73 having an output 73b connected to a second input 75b of an AND gate 75, wherein a first input 75a is logically an input A 71b of data selector unit 71. An output 75c of AND gate 75 is connected to a first input 79a of an OR gate 79, wherein OR 79 also receives the value from an output 77c of an AND gate 77 in a second input 79b. OR gate 79 has an output 79c which is logically considered to be an output 71d of data selector unit 71. In addition, NOT gate 73 receives, in an input 73a, a signal from a port logically considered as a select port 71a. The value of the signal at select port 71a is also supplied to a first input 77a of AND gate 77, which also receives, in a second input 77b, the signal supplied to an input B 71c of data selector unit 71. The value of the output of data selector unit 71—i.e., the value at output 71d of data selector unit 71—is based on the values at select port 71a, input A 71b and input B 71c and is as shown in Table 1:

TABLE 1

| Logic table for data selector unit 71. | |
|---|---|
| INPUT (select port 71a) | OUTPUT (output 71d) |
| 0 | value at input A 71b |
| 1 | value at input B 71c |

Output 71d of data selector unit 71 is coupled to a D input 81a of flip flop 81. Flip flop 81 also has a clock port 81b for receiving PCI CLK signal 47. An output 81c represents the Q of flip flop 81 and is connected to select port 71a of data selector unit 71. An output 81d of flip flop 81, representing the inverse of the signal generated at output 81c, is connected to access inhibitor line 33.

Multiple access inhibitor unit 11 also contains an AND gate 61 for receiving STOP signal 37, at a first input 61a; and FRAME signal 39, at a second input 61b, for performing an AND function and outputting the results at an output 61c. In addition, an AND gate 63 receives FRAME signal 39 at a first input 63a; IRDY signal 41 at a second input 63b; TRDY signal 43 at a third input 63c; and DEVSEL signal 45 at a fourth input 63d. AND gate 63 performs an AND function on its inputs and outputs the results at an output 63e. The values at output 61c and output 63e are fed into a first input 65a and a second input 65b of OR gate 65, respectively. The value at an output 65c of OR gate 65 is in turn to input A 71b of data selector unit 71.

While the invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A computer system comprising:
    a bus providing signals for determining a next bus transaction;
    a processor coupled to said bus; and
    a bus device coupled to said bus, said bus device including:
        a first register coupled to said bus;
        a first gate having an output coupled to said first register; and,
        a multiple access inhibitor unit having an output coupled to a first input of said first gate, said multiple access inhibitor unit having a set of inputs for receiving said signals for determining said next bus transaction.

2. The computer system in claim 1, wherein a value of said output of said first gate is the result of a logical AND function on said first input and a second input of said first gate, said second input being an access data.

3. The computer system in claim 1, wherein said multiple access inhibitor unit comprises:
    a second gate having:
        a first input for receiving a STOP signal; and,
        a second input for receiving a FRAME signal;
    a third gate having:
        a first input for receiving a DEVSEL signal;
        a second input for receiving a IRDY signal;
        a third input for receiving a TRDY signal; and,
        a fourth input for receiving said FRAME signal;
    a fourth gate having a first input coupled to an output of said second gate and a second input coupled to an output of said third gate;
    a data selector unit having an output for selectively outputting a value of one of a first input and a second input based on a selection value of a selection input; and,
    a flip-flop having a first input coupled to said output of said data selector unit, a second input coupled to a clock signal, a first output coupled to said selection input of said data selector unit, and a second output coupled to a second input of said first gate.

4. In a bus having a bus master and a bus target, a method of preventing access to a memory mapped register in a transaction, comprising the steps of:
    detecting a STOP signal, a FRAME signal, a IRDY signal, a TRDY signal, and a DEVSEL signal;
    generating an access enable signal to said memory mapped register when said FRAME signal is not asserted and said IRDY signal, said TRDY signal, and said DEVSEL signal is asserted;
    generating said access enable signal to said memory mapped register when said DEVSEL signal is not asserted;
    preventing generation of said access enable signal to said memory mapped register when said FRAME signal, said IRDY signal, said TRDY signal, and said DEVSEL signal are asserted; and
    preventing generation of said access enable signal to said memory mapped register when said STOP signal and said FRAME signal is asserted.

5. The method of claim 4, wherein said STOP signal represents a request by said bus target for said bus master to stop said transaction.

6. The method of claim 4, wherein said FRAME signal represents a beginning and a duration of an access by said bus master of said bus.

7. The method of claim 4, wherein said IRDY signal represents an ability of said bus master to complete a data phase of said transaction.

8. The method of claim 4, wherein said TRDY signal represents an ability of said bus target to complete a data phase of said transaction.

9. The method of claim 4, wherein said DEVSEL signal represents said bus target identifying itself as a current target.

10. An apparatus which prevents access to a memory mapped register in a transaction in a bus having a bus master and a bus target, comprising:
    means for detecting a STOP signal, a FRAME signal, a IRDY signal, a TRDY signal, and a DEVSEL signal;
    means for generating an access enable signal to said memory mapped register when said FRAME signal is not asserted and said IRDY signal, said TRDY signal, and said DEVSEL signal is asserted;
    means for generating said access enable signal to said memory mapped register when said DEVSEL signal is not asserted;
    means for preventing generation of said access enable signal to said memory mapped register when said FRAME signal, said IRDY signal, said TRDY signal, and said DEVSEL signal are asserted; and means for preventing generation of said access enable signal to said memory mapped register when said STOP signal and said FRAME signal is asserted.

11. The apparatus of claim 10, wherein said STOP signal represents a request by said bus target for said bus master to stop said transaction.

12. The apparatus of claim 10, wherein said FRAME signal represents a beginning and a duration of an access by said bus master of said bus.

13. The apparatus of claim 10, wherein said IRDY signal represents an ability of said bus master to complete a data phase of said transaction.

14. The apparatus of claim 10, wherein said TRDY signal represents an ability of said bus target to complete a data phase of said transaction.

15. The apparatus of claim 10, wherein said DEVSEL signal represents said bus target identifying itself as a current target.

* * * * *